Dec. 4, 1951  W. RUSKA  2,577,210
BOTTOM HOLE SAMPLER
Filed Sept. 24, 1945

WALTER RUSKA
INVENTOR.
BY Lester B. Clark
Ray L. Smith
Attorneys.

Patented Dec. 4, 1951

2,577,210

UNITED STATES PATENT OFFICE 2,577,210

BOTTOM HOLE SAMPLER

Walter Ruska, Houston, Tex.

Application September 24, 1945, Serial No. 618,274

2 Claims. (Cl. 166—19)

This invention relates to the procurement of samples within deep well bores, and more particularly to new and useful improvements in devices for obtaining samples under pressure and hence the conditions existing at the level of the sample taking.

The primary object of the invention is to provide a device of the class described which is of small radial dimensions and light in weight, and yet capable of effectively obtaining samples and withstanding the pressures existing at the level of sample taking.

Another object is to provide a device that can be set for operation at the end of a predetermined time interval, the device being lowered to the desired level preliminary to automatic operation for entrapping the sample when the time interval has elapsed.

Another object is to provide a sample taking device which is positive in action, and which is so constructed that it will effectively entrap a sample at the level at which a sample is desired.

Still another object is to provide a device having a sample chamber and a passage therethrough so that well fluids pass freely through the device while lowering to the sample taking position, means being provided for closing the passage and entrapping the desired sample within the chamber.

A still further object is to provide a device which actuates in response to fluid pressure at the depth of sample taking after the timing mechanism initiates such operation.

Still another and more specific object is to provide a device which includes a liquid chamber, and an air chamber, the liquid chamber having a piston which is subjected to pressure within the well, and means for releasing the liquid from the liquid chamber to the air chamber whereby the piston moves under the influence of the well pressure.

Another object is to provide a frangible seal for the liquid chamber, and time actuated means for breaking said seal.

A still further object is to provide a sample taking assembly from which the sample chamber may be removed and used as a shipping container, or from which the sample may be transferred to another container for shipment.

The foregoing objects together with other objects and advantages of the invention will be more fully apparent from the following description taken in connection with the accompanying drawings in which.

Figure 1:
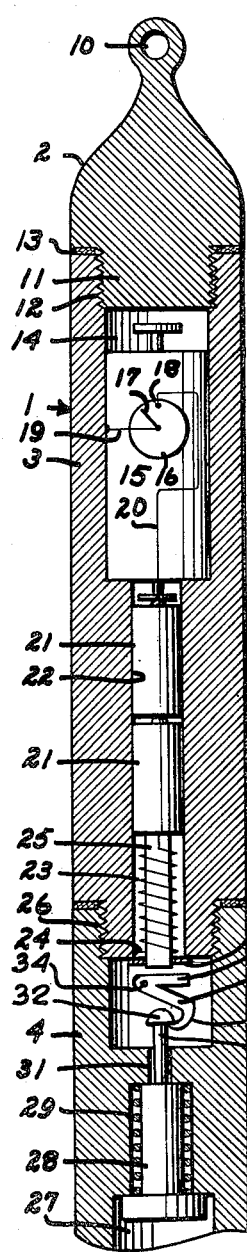
Fig. 1 is an elevational sectional view of the upper portion of a device embodying the invention.
Figure 2:
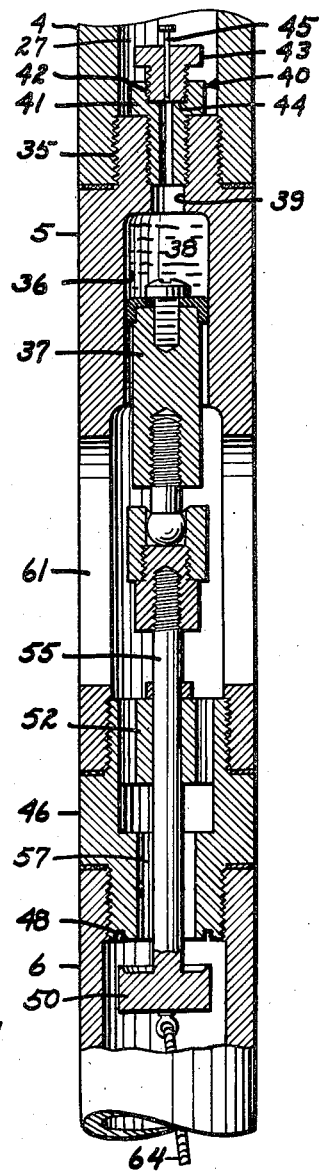
Fig. 2 is a vertical sectional view of the central portion of the device and constitutes a continuation of the structure shown in Fig. 1.

The invention as embodied in the device shown in the drawings includes a composite housing 1 including a wire line head 2, a clock barrel 3, an air chamber assembly 4, a liquid chamber 5, a sample receiving chamber 6, and a nose or guide 7 at its lower end.

It is intended that the device shall be lowerable upon a wire line, and to this end the head 2 is provided with an eye 10 to receive such line. It is, of course, to be understood that if desired, the head 2 may be constructed for attachment to a tubing string as is well known in the art.

The lower end of the head is reduced in cross section at 11, and is threaded at 12 for engagement with the barrel 3. The gasket 13 is interposed between the head 2 and the barrel 3 to provide a seal and thereby prevent leakage to the chamber 14 within the barrel. The upper portion of the chamber 14 within the barrel 3 is enlarged to receive the clock mechanism 15 which includes a time actuated switch 16 having driven contactor 17 which moves to engage the stationary contact 18, and thereby close a circuit between the ground 19 and the conductor 20 which is electrically connected to one terminal of the cells 21 located within the bore 22 below the clock 15.

The other terminal of the cells 21 is connected to the coil 23 grounded at 24, and which surrounds the magnetizable core 25. The air chamber assembly 4 is attached to the barrel 3 by threads 26. This assembly includes an air chamber 27 having a plunger 28 at its upper end. This plunger is normally urged downwardly within the chamber by means of the compression spring 29. The upper end of the plunger has an extension 30 of reduced cross section which passes through the opening 31 at the upper end of the chamber 27. The head 32 on this extension is normally engaged by the point or prong 33' of the bell crank lever 33. The pin 34, which extends transversely of the air chamber housing or assembly 4 and is supported at either end in the wall thereof, has the bell crank lever 33 pivotally mounted thereon so that the arm 34' is adjacent the lower end of the magnetizable core 25. It seems apparent that energization of the core 25 by an electric current passing through the coil 23 will lift the arm 33 whereby the plunger 28 is released for movement under the influence of the spring 29 to serve a purpose that will more fully appear.

The chamber 5 threadedly attached to the air chamber 4 at 35 has a bore 36 which is closed at its lower end by a piston 37. The chamber thus formed is filled by a noncompressible fluid 38 such as oil. The upper end of this chamber has a passage 39 leading to the air chamber 27, and which is normally closed by a pin and disc assembly 40 comprising the tubular screw 41 having a counterbore 42 in its upper end to receive the cap member 43 and an interposed frangible disc 44 which is adapted to be broken by impact upon the pin 45.

The sample receiving chamber 6 is interconnected at its opposite ends with the liquid chamber 5, and the nose or guide 7 by means of identical flanged nipples 46 and 47 having valve seats 48 and 49 within the sample chamber to be engaged by outwardly moving valves 50 and 51.

The flanged nipple 46 has a valve guide 52 at its upper end to receive and guide the valve stem 55, while the bore 57 at the lower end of the nipple is enlarged to provide an annular passage about the valve stem. Likewise, the flanged nipple 47 has a valve guide 52' at its lower end to receive and guide the valve stem 55', while the bore 57' at the lower end of the nipple is enlarged to provide an annular passage about this valve stem. By means of this construction and with the valves 50 and 51 in open position, as shown in the drawings, fluid may enter the openings 60 in the nose and thence pass through the sample chamber and outwardly through openings 61 in the walls of the chamber 5 as the device is being lowered within a well bore. This assures that a representative sample is within the sample chamber at each level to which the device is moved.

Figure 3:
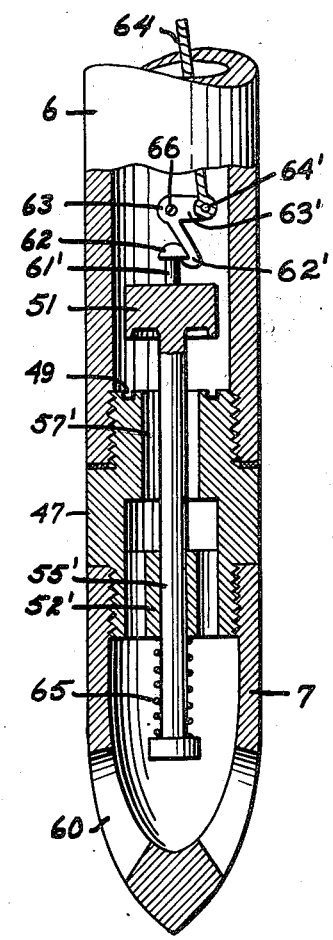
Fig. 3 is an elevational view partly in section showing the lower end of the device extending downwardly from the portion shown in Fig. 2.

In preparing the device for obtaining a sample the pin and disc assembly 40 is installed, as shown, after the chamber 38 has been filled with a suitable fluid such as oil. The quantity of oil is such that the valve 50 is held in open position, and the cable 64, which connects the valve 50 and the bell crank lever 63, is of such length that the lower valve 51 will be released by the bell crank lever 63 when the valve 50 moves toward closed position. This is obvious when Fig. 3 is considered. The bell crank lever 63 is pivotally mounted upon the pin 66 which extends transversely of the sample receiving chamber 6 and is supported at either end in the wall thereof. The cable 64 is connected to the pin or lug 64' on the arm 63' of the bell crank lever 63, and in normal or open position of the valves, the point or prong 62' of the lever 63 engages under the head 62 of the pin 61'.

The plunger 28 is moved to latching engagement with the arm 33, and the clock barrel 3 is then attached to the air chamber assembly 4. Cells 21, or other suitable source of energy, are placed within the barrel 3 and the clock and switch mechanism 15 is set to provide the desired time interval between the assembling of the device and the time of taking of a sample. The clock 15 is then positioned within the chamber 14 and the wire line head 2 is secured in place.

It seems apparent that further operation desirably takes place by lowering the device within a well to a level at which a sample is to be taken. The device is then suspended at that level until sufficient time has elapsed that the moving contactor 17 engages the contact 18, and thereby energizes the coil 23 to lift the arm 33 and release the plunger 28. The plunger then moves downwardly and engages the pin 45 which penetrates the disc 44.

Since the air chamber 27 has a relatively low pressure therein, and since well pressure is impressed upon the lower end of the plunger 37, the body of oil 38 is immediately forced through the punctured disc 44 and into the chamber 27. The valve 50 therefore moves upwardly to closed position upon its seat 48. At the same time the cable 64 moves the bell crank lever 63 from engagement with the head 62 on pin 61, whereby the valve 51 is released for downward movement under the influence of spring 65 surrounding the stem 55' thus the valve 51 likewise moves to engagement with its seat 49 under the influence of the spring 65 surrounding the stem 55' thereof. In this manner the sample within the sample receiving chamber is entrapped therein.

When the device is withdrawn from within a well bore, the elements 5 and 7 may be removed from the sample chamber 6 which contains the desired sample under the pressure which existed at the level of sample taking. Caps may be placed upon the ends of the chamber so that the chamber may be used as a shipping container. Alternately of course, instrumentalities may be provided for removing the sample from the chamber 6 to a different container for shipment and analysis of the sample.

As shown in Fig. 1, the plate 25' supports the core 25 and consequently should be of a nonmagnetic material rigidly connected to the barrel 3. It can be seen if the plate 25' is connected to support the core 25 as indicated, when the weld or connection between the barrel 3 and plate 25' is fluid tight, and when such weld or connection between the plate 25' and core 25 is also fluid tight, then the plate 25' not only supports the core 25 but effectively divides the space between what may be termed the clock chamber 14 and air chamber 4, thereby preventing fluid, as the fluid 38, from working upward into the clock chamber 14. Thus the plate 25', is obviously intended to complement the gasket 13, described hereinabove, in the exclusion of fluid from the clock chamber, while the magnetic lines of force induced by the energizing of the coil 23 around the core 25 act through the end of the core 25 and across the plate 25' to attract the arm 34' of the bell crank lever 33.

Broadly the invention comprehends a sample taking device that is simple and inexpensive to construct and maintain, and also which is positive in action to confine a sample under the pressure existing at the level of procurement of the sample.

What is claimed is:

1. In a well fluid sample taking device, a housing having a sample receiving chamber therein, a valve seat at the upper end and a valve seat at the lower end of said sample receiving chamber, a frangible seal across said housing spaced above said sample receiving chamber to provide a closed upper chamber above said seal; a piston spaced below said seal and operable in said housing to provide a second chamber below said upper chamber, a non-compressible fluid filling said second chamber, an upper valve in said sample receiving chamber, means connecting said piston to said upper valve to space said upper valve in open position when said second chamber is fluid filled, a lower valve in said sample receiving chamber, means urging said lower valve to closed position, means releasably connecting said upper and lower valve to hold said lower valve in open position until said upper valve moves upwardly from open position, opening means in said housing between said upper seat and said piston and below said lower seat so that well fluid may pass through said sample receiving chamber when said valves are opened, means separating said upper chamber into a fluid tight chamber and an air chamber therebelow immediately above said frangible seal, magnetic force supplying means above said chamber separating means for applying magnetic attraction therebelow, time controlled means in said fluid tight chamber adapted to actuate said magnetic force supply means after a predetermined time interval to apply said magnetic attraction, and means operable by said magnetic attraction to rupture said seal so that well fluid pressure below said piston may move said piston upwardly to close said upper valve and release said lower valve to be closed by said urging means, thereby entrapping a sample of fluid in said sample receiving chamber as said non-compressible fluid is forced into said air chamber.

2. In a well fluid sample taking device, a housing having a sample receiving chamber therein, an upwardly closing valve at the upper end and a downwardly closing valve at the lower end of said sample receiving chamber, a frangible seal across said housing spaced above said sample receiving chamber to provide a closed upper chamber above said seal, a piston spaced below said seal and operable in said housing to provide a second chamber below said upper chamber, a non-compressible fluid filling said second chamber above said piston, means adapted to hold said valves open when said second chamber is filled and to close said valves upon upward motion of said piston, opening means in said housing between said upper valve and said piston and below said lower valve so that well fluid may pass through said sample receiving chamber when said valves are opened, means separating said upper chamber into a fluid tight chamber and an air chamber therebelow immediately above said frangible seal, magnetic force supplying means above said chamber separating means for applying magnetic attraction therebelow, time controlled means in said fluid tight chamber adapted to actuate said magnetic force supplying means after a pre-determined time interval to apply said magnetic attraction, and means operable by said magnetic attraction to rupture said seal so that well fluid pressure below said piston may move said piston upwardly to close said valves thereby entrapping a sample of fluid in said sample receiving chamber as said non-compressible fluid is forced into said air chamber.

WALTER RUSKA.

REFERENCES CITED

The following references are of record in the file of this patent:

UNITED STATES PATENTS

| Number | Name | Date |
|---|---|---|
| 2,147,983 | Lindsly | Feb. 21, 1939 |
| 2,161,557 | Clark | June 6, 1939 |
| 2,249,815 | Ennis | July 22, 1941 |
| 2,342,367 | Pryor | Feb. 22, 1944 |
| 2,364,464 | Moore | Dec. 5, 1944 |

FOREIGN PATENTS

| Number | Country | Date |
|---|---|---|
| 330,317 | Great Britain | June 12, 1930 |